(12) United States Patent
Gennesseaux et al.

(10) Patent No.: US 6,364,294 B1
(45) Date of Patent: Apr. 2, 2002

(54) ACTIVE HYDRAULIC ANTI-VIBRATION SUPPORT AND AN ACTIVE ANTI-VIBRATION SYSTEM INCORPORATING SAID SUPPORT

(75) Inventors: André Gennesseaux, Conie-Molitard; Patrice Loubat, Villemandeur; Jean-Luc Gastineau, St-Jean-Froidmentel; Joël Menager, St-Hilaire-sur-Yerre, all of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/571,699

(22) Filed: May 15, 2000

(30) Foreign Application Priority Data

May 17, 1999 (FR) .............................. 99 06219

(51) Int. Cl.$^7$ .............................................. F16F 13/00
(52) U.S. Cl. .................................. 267/140.13; 267/219
(58) Field of Search ..................... 207/140.11–140.15, 207/141.2, 219, 122, 35; 180/312, 902; 249/636, 638, 562

(56) References Cited

U.S. PATENT DOCUMENTS

| 4,988,074 A | 1/1991 | Najmolhoda ........... 251/129.08 |
| 5,265,703 A | 11/1993 | Ackermann ................ 188/299 |
| 5,277,409 A | 1/1994 | Goto et al. ............. 267/140.14 |
| 5,297,781 A | 3/1994 | Genneaaeaux ......... 267/140.14 |
| 5,366,211 A | * 11/1994 | Hamada ................ 267/140.14 |
| 5,961,104 A | 10/1999 | Gennesseaux ......... 267/140.14 |
| 6,199,842 B1 | * 3/2001 | Gennesseaux ......... 267/140.14 |

FOREIGN PATENT DOCUMENTS

| EP | 0 536 760 | 4/1993 |
| EP | 08086328 | 4/1996 |
| EP | 0 762 442 | 3/1997 |
| EP | 0 785 558 | 7/1997 |
| EP | 0 893 620 | 1/1999 |
| FR | 2 657 666 | 8/1991 |
| FR | 2 678 993 | 1/1993 |
| FR | 2 782 764 | 3/2000 |
| JP | 09317815 | 5/1996 |

OTHER PUBLICATIONS

French Preliminary Search Report dated Feb. 16, 2000, French Application FR 9906219.

* cited by examiner

Primary Examiner—Christopher P. Schwartz
Assistant Examiner—C. T. Bartz
(74) Attorney, Agent, or Firm—Marshall, Gerstein & Borun

(57) ABSTRACT

An anti-vibration support comprising two rigid frames joined to one another by an elastomer body which is applied against a rigid partition to define a hydraulic working chamber linked to a compensating chamber by a throttled passage. The liquid contained in the working chamber is in contact with a piston controlled by an electromagnetic actuator with a proportional electromagnet.

9 Claims, 7 Drawing Sheets

ACTIVE HYDRAULIC ANTI-VIBRATION SUPPORT AND AN ACTIVE ANTI-VIBRATION SYSTEM INCORPORATING SAID SUPPORT

FIELD OF THE INVENTION

The present invention relates to active hydraulic anti-vibration supports and to active anti-vibration systems incorporating such supports.

More specifically, the invention relates to an active hydraulic anti-vibration support designed to be inserted between two rigid elements in a motor vehicle in order to damp and filter vibrations between these two elements, this support comprising at least:

first and second rigid frames which can be joined to the first and second rigid elements respectively, an elastomer wall linking the first and second frames to one another and defining a working chamber filled with liquid, a piston which has at least one face in contact with the liquid and which is mounted on the first frame so that it can be displaced in an axis of vibration, this piston being biased towards a rest position by resilient means, an electromagnetic actuator comprising:

an electromagnet comprising an electric coil co-operating with a metal frame, a mobile magnetic core which is displaceable under the action of the electromagnet and which is linked to the piston in order to generate counter-vibrations in the liquid.

BACKGROUND OF THE INVENTION

An active anti-vibration support of this type is described in document EP-A-0 893 620, for example, which discloses a variant having an electromagnetic actuator with a single electromagnet co-operating with a return spring.

These known active anti-vibration supports have position sensors for the piston and their chain of command includes a system automatically controlling this position, allowing the electromagnetic actuator to operate over a very broad range of frequencies, including whilst the vehicle is travelling.

Anti-vibration supports of this type are satisfactory as far as their anti-vibration effect is concerned but have the disadvantage of being complex and expensive and require control means which are in turn complex and expensive.

In an attempt to overcome this disadvantage, various pneumatically controlled active anti-vibration supports have been proposed, such as that disclosed in document JP-A-9 317 815. In practice, these pneumatically controlled supports generally use a vacuum source which is also used to assist braking.

For reasons of safety, however, certain automotive manufacturers do not wish to use the vacuum source of the assisted braking system to control the active supports. Furthermore, pneumatically controlled active anti-vibration supports are still relatively costly and complex insofar as these supports require a connection to the vacuum source. Finally, not all motor vehicles allow a link to a vacuum source.

OBJECTS AND SUMMARY OF THE INVENTION

Accordingly, the objective of the present invention is to overcome the above-mentioned disadvantages inherent in electromagnetically controlled active anti-vibration supports, without having to resort to a pneumatic control system.

To this end, the invention proposes a hydraulic anti-vibration support of the type in question which is essentially characterised in that the electromagnetic ac-actuator, the shape of the frame of the electromagnet and the mobile core being designed so that when an electric current of a value within a normal operating range is passed through the coil and the mobile core is located within a certain range of positions corresponding to the normal operating range of the electromagnetic actuator, the mobile core is subjected to a force which depends solely on this current (in particular, the electromagnetic actuator may be a proportional solenoid, known per se in other applications, which exerts a force proportional to the current passing through the coil or to the square of this current: examples of solenoids of this type are described in particular in documents EP-A-0 785 558, EP-A-0 762 442 and U.S. Pat. No. 4,998,074).

As a result of these features, the electromagnetic actuator of the anti-vibration support proposed by the invention can be controlled in a very simple manner, merely by controlling the electric current passing through the coil of the electromagnet. In practice, since the force exerted by the actuator on the liquid of the anti-vibration support depends solely on said current and not on the position of the mobile core, it is no longer necessary to measure this position or to use a position control system as a means of accurately controlling the force exerted on the piston at each instant.

The control means needed to control the anti-vibration support proposed by the invention are therefore very much simplified and in particular may be provided by the central electronic processing unit of the motor vehicle.

It should be pointed out that the anti-vibration support proposed by the invention offers maximum effectiveness at relatively low frequencies (typically from 20 to 40 Hz in a 4-cylinder internal combustion engine and more generally from 0 to 100 Hz), corresponding to operation of the engine during idling. Since these are the frequencies which create the most unpleasant and most perceptible effects to the vehicle user, the effectiveness of the anti-vibration support proposed by the invention is particularly satisfactory.

When the engine is operating at speeds higher than idling, which normally corresponds to a situation in which the vehicle is driving, a higher current than normal is temporarily circulated in the coil of the electromagnet in order to lock the electromagnetic actuator by causing the mobile core to "stick" to the frame of the electromagnet, it then being possible to reduce this locking current once the mobile core has "stuck".

However, the electromagnetic actuator of the anti-vibration device proposed by the invention could continue to operate at higher frequencies than idling in order to continue generating counter-vibrations with a view to cancelling out the engine vibrations.

In preferred embodiments of the anti-vibration support proposed by the invention, one and/or the other of the following features may optionally be incorporated:

the shapes of the frame of the electromagnet and the mobile core are designed so that the mobile core is subjected to a force proportional to the square of the intensity of the electric current passing through the coil when this electric current is of a value falling within the range of positions corresponding to normal operation of the electromagnetic actuator;

the anti-vibration support also has a flexible elastomer wall which is supported by the first frame and defines a compensating chamber filled with liquid communicating with the working chamber via a throttled passage;

the anti-vibration support also has a control chamber filled with liquid, which communicates with the working chamber via a throttled passage, the piston being in contact with the liquid contained in this control chamber;

the force exerted by the electromagnet on the mobile core is always directed in a same direction and has a certain mean value, the resilient means being arranged so as to bias the mobile core in the direction opposite the force exerted by the electromagnet, these resilient means being dimensioned so that when the electromagnetic is exerting said mean force on the mobile core, the mobile core is located in a mean position, substantially centred relative to the range of positions corresponding to normal operation of the electromagnetic actuator;

the frame and the mobile core are made from a laminated metal material and one constitutes a first magnetic element and the other a second magnetic element, the frame being substantially U-shaped with a base extending along a transverse axis perpendicular to the axis of vibration between two side branches extending parallel with the vibration axis, the coil being disposed between the side branches and centred on the vibration axis surrounding a central rod extending along said vibration axis and belonging to the first magnetic element, this central rod being separated from the second magnetic element by a certain air gap along the vibration axis, and the second magnetic element also having two first linearization poles which frame the central rod along the transverse axis and which extend parallel with the vibration axis inside the coil, being of a transverse width which decreases towards the first magnetic element, the two first linearization poles and the central rod respectively having parallel faces facing one another;

the first magnetic element also has two second linearization poles which are reciprocally aligned along the transverse axis and which are arranged outside the coil, these second linearization poles being of a transverse width which decreases towards the second magnetic element, this second magnetic element comprising two axial walls extending along the vibration axis and framing the two second linearization poles, the two second linearization poles and the two axial walls respectively having parallel faces facing one another.

Furthermore, another objective of the invention is to provide an active anti-vibration system incorporating an anti-vibration support as defined above and a control circuit which supplies the coil of the electromagnet, this control circuit being set up so as to determine at each instant the current applied to the coil as a function of at least one parameter linked to engine operation, independently of the instantaneous position of the mobile core relative to the frame of the electromagnet.

In preferred embodiments of the anti-vibration system proposed by the invention, one and/or the other of the following features may be incorporated:

the control circuit has a computer controlling the engine of the motor vehicle which is set up to determine at each instant the electric current applied to the coil of the electromagnet as a function of a synchronisation signal linked to the real operating cycle of the engine and as a function of data stored in memory, said stored data giving at least the amplitude and the phase of a signal representative of the electric current applied to the coil as a function of said synchronisation signal;

the signal representative of the electric current is substantially a rectangular signal and the anti-vibration support has a control chamber filled with liquid which communicates with the working chamber via a throttled passage, the piston being in contact with the liquid contained in this control chamber;

the control circuit is set up so as to apply to the coil of the electromagnet an electric current which is strong enough to lock the mobile core if the synchronisation signal corresponds to a speed in excess of a predetermined frequency.

BRIEF DESCRIPTION OF THE DRAWINGS

Other features and advantages of the invention will become clear from the following description of several of its embodiments, given by way of illustration and not restrictive in any respect, and with reference to the appended drawings.

Of the drawings.

MORE DETAILED DESCRIPTION

Figure 1:
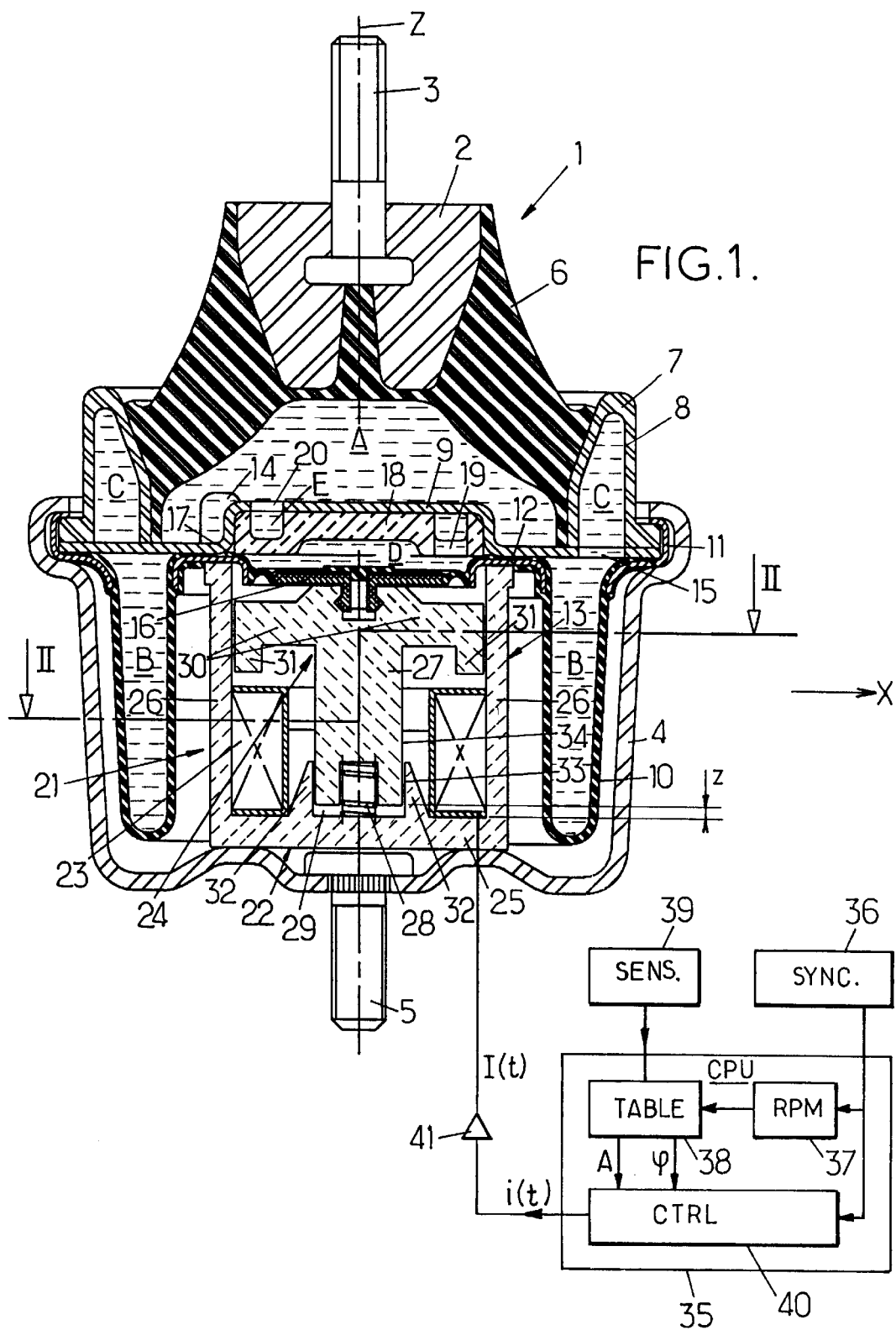
FIG. 1 is a view of a first embodiment of an anti-vibration support proposed by the invention, seen in vertical section, with a block diagram of the control circuit for this support.

The same reference numerals are used in the different drawings to denote identical or similar elements.

FIG. 1 shows an active hydraulic anti-vibration support 1, which conventionally comprises:

a rigid metal head extended at the top by a pin 3 with a vertical axis Z, designed to be fixed to a part of the engine propulsion group of a motor vehicle, for example, a rigid metal base 4 which, in the example illustrated, is provided as a cup, the base of which is extended at the bottom by a pin 5 having an axis Z, designed to be fixed to the chassis of the vehicle, for example, and a thick, elastomer wall 6 of a truncated cone shape which is centred on the axis Z and which flares out in a downward direction from an apex joined to the head 2 down to an annular base which is joined to provide a seal with a rigid metal crown 7 which is hollow, defining a groove 8 open towards the bottom, the thick wall 6 being sufficiently strong to withstand compression so that it can function as a support for the engine propulsion group fixed to the head 2.

In addition, a rigid metal partition 9 is fixed underneath the crown 7, preferably by crimping at the top peripheral edge of the base 4 in a cup arrangement on the crown 7, the partition 9 delimiting with the elastomer wall a working chamber A filled with liquid, preferably silicon oil.

Furthermore, a flexible elastomer membrane 10 is moulded:

on the one hand onto an external frame 11 which is pushed, providing a tight seal, underneath an external periphery of the partition 9, the top peripheral edge of the base 4 being crimped onto the crown 7, and, on the other hand, onto an inner annular frame 12 which is pushed, providing a tight seal, underneath the partition 9, this partition being joined to a rigid frame 13 which will be described below, said frame 13 in turn being pressed against the frame 12 by the bottom of the base 4.

The flexible elastomer membrane 10 therefore defines an annular compensating chamber B between frames 11 and 12 which is filled with liquid and which communicates with the working chamber A via a throttled passage C describing an arc delimited between the groove 8 of the crown 7 and the partition 9. This throttled passage C opens into the working chamber A via a horizontal opening 14 provided in the crown 7 and opens into the compensating chamber B via an opening 15 provided in the partition 9.

Finally, the flexible membrane 10 has a central part moulded onto a rigid piston 16 which is joined to the inner annular frame 12 by means of an annular elastomer bellows 17 belonging to said flexible membrane 10 and enabling the piston 16 to be vertically displaced as it vibrates.

The piston 16 delimits a control chamber D, filled with liquid, in conjunction with a dish-shaped central part of the partition 9 projecting upwards into the interior of the working chamber A.

A rigid insert 18 made from metal or a plastics material is arranged in a nest fit in the central dish-shaped part of the partition 9 defining, in conjunction with said partition 9, a throttled arcuate passage E which communicates:

on the one hand with the control chamber D via an orifice 19 pierced through the bottom part of the insert 18, and on the other hand with the working chamber A via an orifice 20 pierced through the partition 9.

Figure 2:
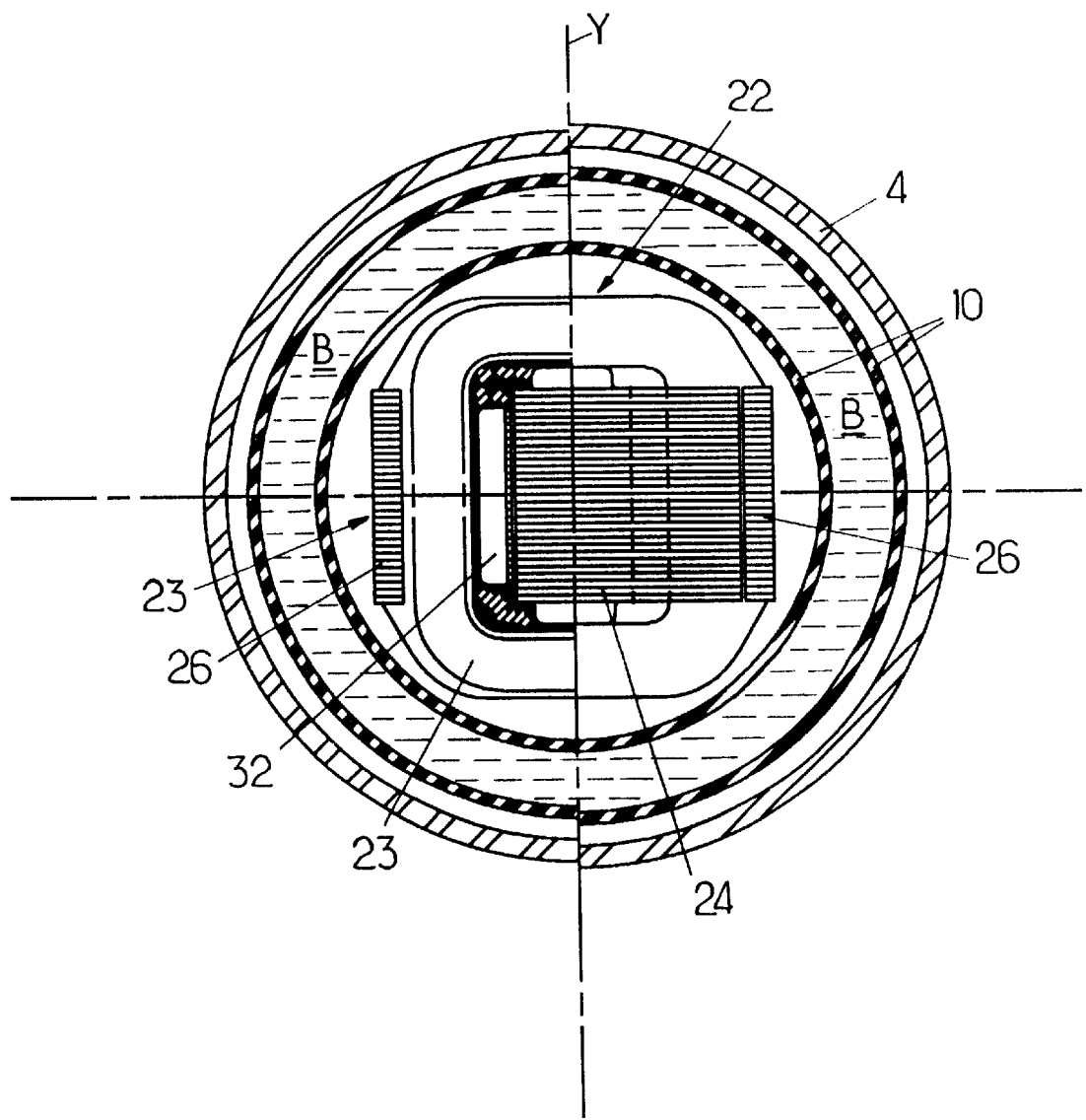
FIG. 2 is a view in section along the line II—II of FIG. 1.
Figure 3:
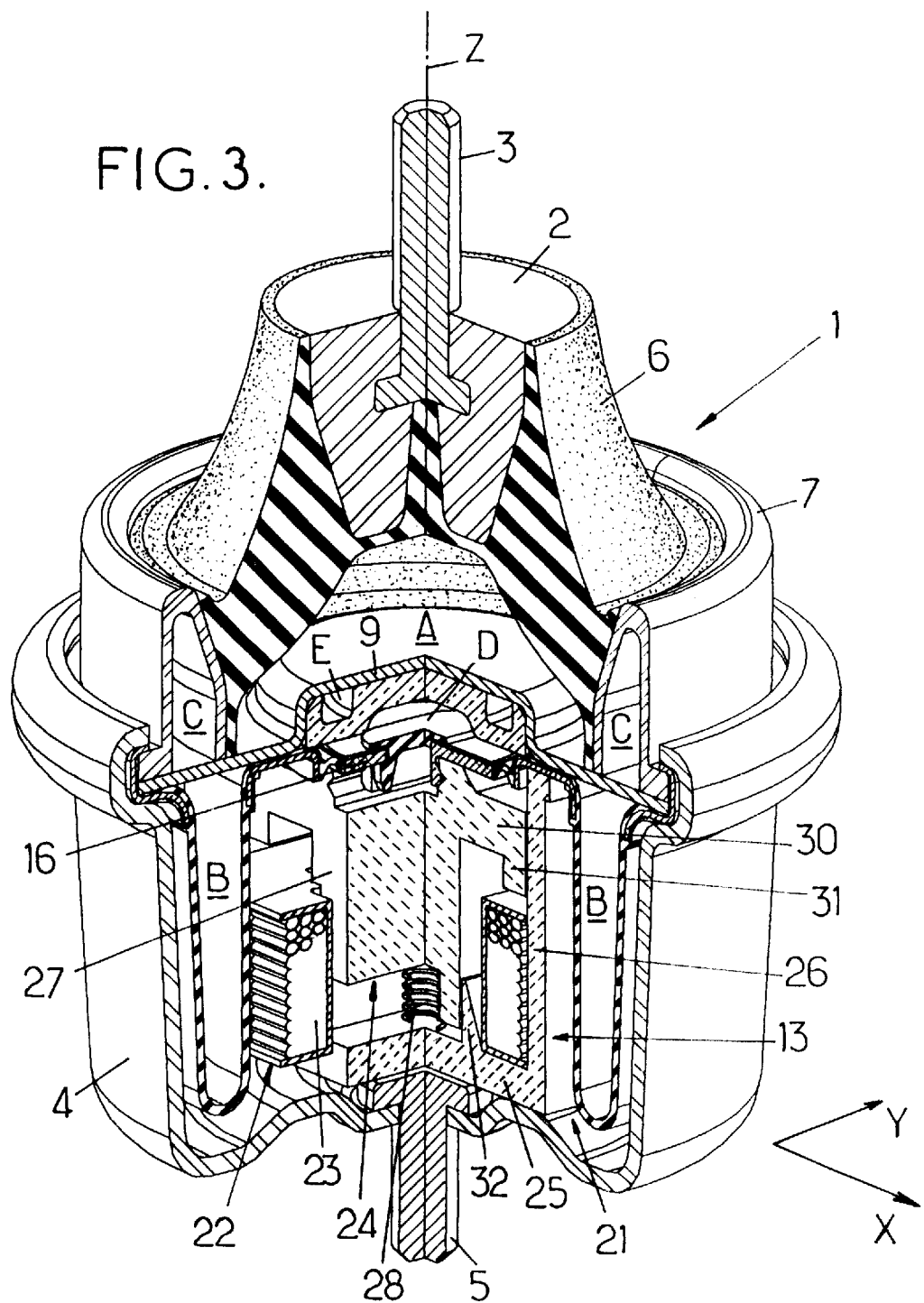
FIG. 3 is a view showing the interior of the anti-vibration support of FIG. 1.

As illustrated in FIGS. 1 to 3, the piston 16 is controlled by an electromagnetic actuator 21 with variable reluctance which comprises:

an electromagnet 22 which in turn comprises, on the one hand, the metal frame 13 mentioned above, made from a magnetic material and preferably a laminated material, for example a base of silicon steel sheets bonded to one another, and, on the other hand, an annular electric coil 23 which is centred on the vertical axis Z and which is arranged inside the frame 13, and a mobile magnetic core 24 which in turn is preferably made from a laminated metal material, for example sheets of silicon steel bonded to one another, this mobile core being joined to the piston 16.

In the example illustrated, the metal frame 13 is of a U shape contained in a vertical plane comprising on the one hand the axis Z, and on the other hand a transverse horizontal axis X, the frame 13 therefore having a horizontal base 25 and two side branches 26 with a rectangular horizontal cross section, each extending upwards and framing the coil 23.

Furthermore, the mobile coil 24 has a vertical rod 27 with a rectangular horizontal cross section, which is biased upwards by a spring 28 bearing on the base 25 of the frame 13 and which is separated from said base by an air gap.

The top end of the central rod 27 is joined to the piston 16 in a push fit and extends towards the exterior in two horizontal arms 30, in turn extended downwards by two rims 31 arranged facing the side branches 26 of the frame 13.

Finally, the base 25 of the frame 13 has two linearization poles 32 each of which is provided in the form of a rib extending horizontally along an axis Y perpendicular to the axis X mentioned above, each linearization pole extending vertically and being of a transverse width (measured along the axis X) which decreases towards the top.

These two linearization poles frame the central rod 27 of the mobile core and have two vertical inner faces 33 which are parallel with the opposite faces 34 of the rod 27.

The linearization poles 32 act so that the force exerted by the electromagnet 22 on the mobile core 27 depends solely on the intensity of the electric current circulating in the coil 23, provided this current intensity is within a normal operating range and as long as the height z of the air gap is in turn within a normal operating range.

Figure 4:
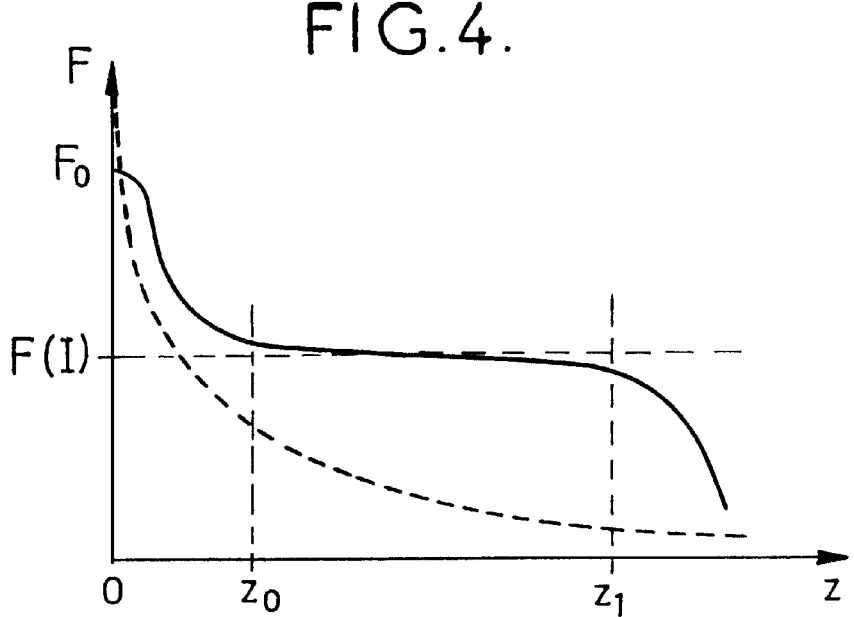
FIG. 4 is a diagram showing the force generated at constant current by a linear electromagnetic actuator such as that fitted with the anti-vibration support of FIG. 1, depending on the displacement of the mobile core as compared with the force generated by a non-linear electromagnetic actuator used in anti-vibration supports known from the prior art.

Consequently, as shown by the solid line in FIG. 4, when the electric current I passing through the coil 23 is kept constant, the force F exerted by the electromagnetic actuator 21 on the piston 16 is substantially constant and equal to a value F(I) proportional to the square of the intensity of the electric current I, as long as the value z of the air gap falls within two predetermined values z0 and z1. Below z0, the force F at constant current I increases rapidly until it reaches a sticking value F0 when the air gap z becomes zero. Conversely, the force F decreases rapidly if the air gap z becomes greater than z1, although it should be pointed out that the travel of the piston 16 can be limited so that the air gap z never becomes greater than z1.

As illustrated by a broken line in FIG. 4, the non-linear electromagnetic actuators conventionally used with hydraulic anti-vibration supports produce a force F on the piston 16 which is largely dependent on the value z of the air gap, which means that it was necessary to measure this air gap constantly and use the value of the current at the measured value z as a means of effectively controlling the electromagnetic actuator, which makes for a complex and expensive actuating system.

In the case of the anti-vibration system proposed by the invention, on the other hand, the active anti-vibration support can be controlled by a simple control device, such as that illustrated in FIG. 1 for example, which uses the central processing unit 35 of the engine.

More specifically, the computer 35 receives, in a known manner, as snchronisation signal based on a set of measurements 36 (SYNC.) detecting the engine pistons as they pass too dead centre.

This synchronisation signal is received by the computer 35, which comprises a software module 37 (RPM ) to compute the engine speed in revolution/min from the synchronisation signal. The engine speed is then used by a software module 38 ("TABLE") which, on the basis of tables of values stored in memory, determines the amplitude A and the phase $\phi$ of the signal representative of the current I flowing through the coil 23 as a function of:

the engine speed,
and optionally other external parameters such as data relating to operation of the gearbox, for example, this information being supplied to the computer 35 by one or more sensors 39 (SENS).

The amplitude and phase determined by the software module 38 are transmitted to a module 40 (CTRL) which, on the basis of this amplitude and this phase and on the basis of the synchronisation signal, emits a signal i(t) which may be amplified by an amplifier 41 to give the intensity I(t) passing through the coil 23.

Figure 5:
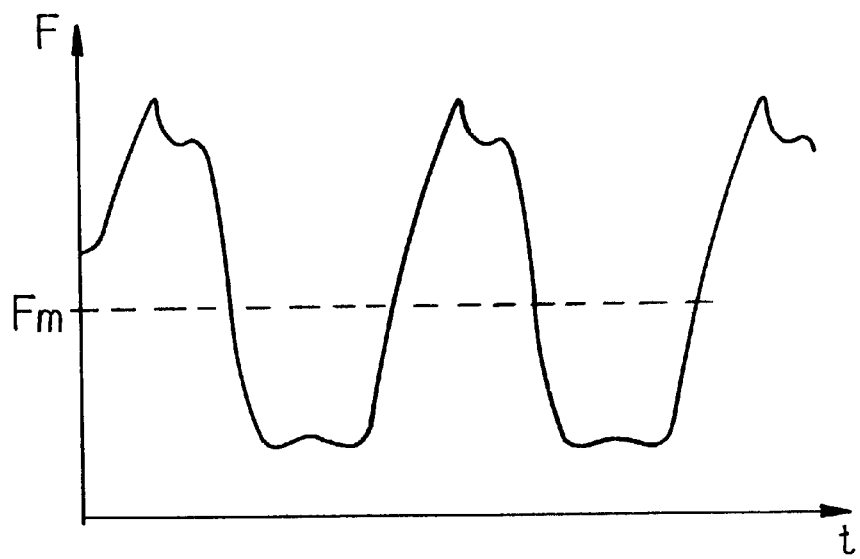
FIGS. 5 and 6 are diagrams showing two examples of curves plotted for the force exerted by the electromagnetic actuator of the anti-vibration support illustrated in FIG. 1 as a function of time.

As illustrated in FIG. 5, the force F(t) proportional to $I(t)^2$ may correspond to a relatively complex signal, in which case it is necessary to control the current I(t) by means of a control system integrated in the computer 35 or in the amplifier 41.

As may be seen from FIG. 5, the force F(t) transmitted to the piston 16 has a mean component Fm, in this case directed downwards since the electromagnet 22 acts on the mobile core 24 in one direction only. To prevent the mean component Fm of the force F from moving the mobile core 24 outside the zone of linearity of the electromagnetic actuator, the spring 28 is dimensioned so as to produce an upwardly oriented force substantially equal to Fm when the mobile core 24 is located at the centre of the zone or linearity, i.e. when the air gap z is substantially equal to the average of z0 and z1 (FIG. 4).

Figure 6:
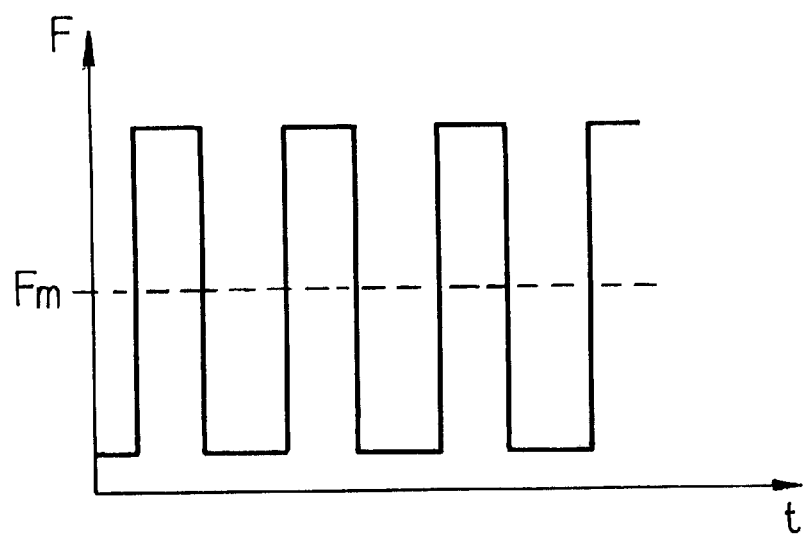

Optionally, as illustrated in FIG. 6, it may be sufficient to generate a rectangular signal i(t) at the level of the computer 35 which will enable a force F(t) to be exerted on the piston 16 which in turn corresponds to a rectangular signal, i.e. of a crenellated shape. This being the case, there is no need to control the signal i(t) or I (t).

This rectangular signal is filtered by the throttled passage E, the resonance frequency of which corresponds to the idling frequency of the engine (about 30 Hz for example) so that the counter-vibrations from the working chamber A effectively cancel out the vibrations exerted by the engine at idling speed in spite of the simplified shape of the signal F(t).

Figure 7:
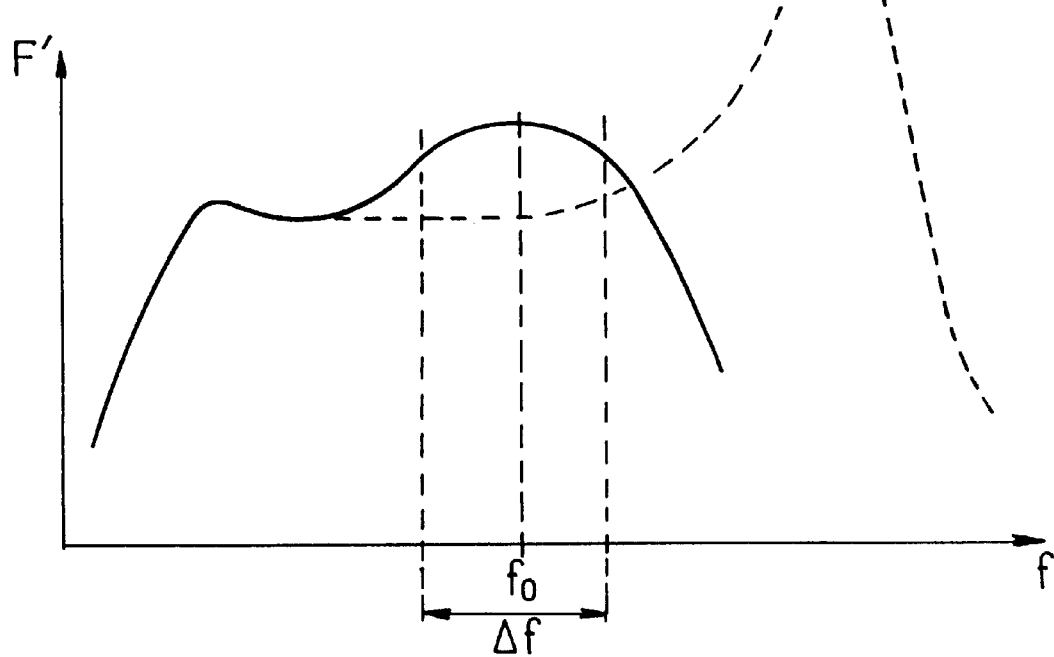
FIG. 7 is a diagram showing the force produced by the anti-vibration support of FIG. 1 depending on the frequency of the vibrations of the piston as compared with the force produced by an active anti-vibration support which does not have a throttled passage between the piston and the working chamber.

Further more, as illustrated in FIG. 7, the control chamber D and the throttled passage E improve the efficiency of the action of the piston 16 at idling frequencies, i.e. within a certain range of vibration frequencies Δf of the piston around the idling frequency f0 (f0 may be in the order of 30 Hz for example and Δf may be in the order of 10 to 20 Hz for example). In effect, as illustrated by the solid line in FIG. 7, the force F' which is exerted between the head 2 and the base 4 of the anti-vibration support is maximised within the range of frequencies Δf for a given amplitude of the signal denoting the force F(t) exerted on the piston.

In the absence of the control chamber D and the throttled passage E, as illustrated by the token line in FIG. 7, the efficiency of the piston action would be reduced at the idling frequencies of the engine. On the other hand, this efficiency would then be greater at relatively high frequencies, in excess of 100 Hz for example, but this is of no importance since the anti-vibration support of the present invention is specifically designed to attenuate vibrations caused by the idling frequencies of the engine, which cause the most discomfort for and are the most perceptible to the user.

Furthermore, if the engine speed exceeds a predetermined value, corresponding to 100 Hz for example (i.e. 1500 revolutions/min in a four-cylinder engine), it is preferable to lock the piston 16 by causing the mobile core 24 of the electromagnetic actuator to "stick" to the frame 13 of the electromagnet. To this end, a strong continuous current is passed through the coil 23 until the air gap z is reduced to 0, after which the current may be reduced due to the fact that the force F0 locking the mobile core is very high (see FIG. 4).

Figure 8:
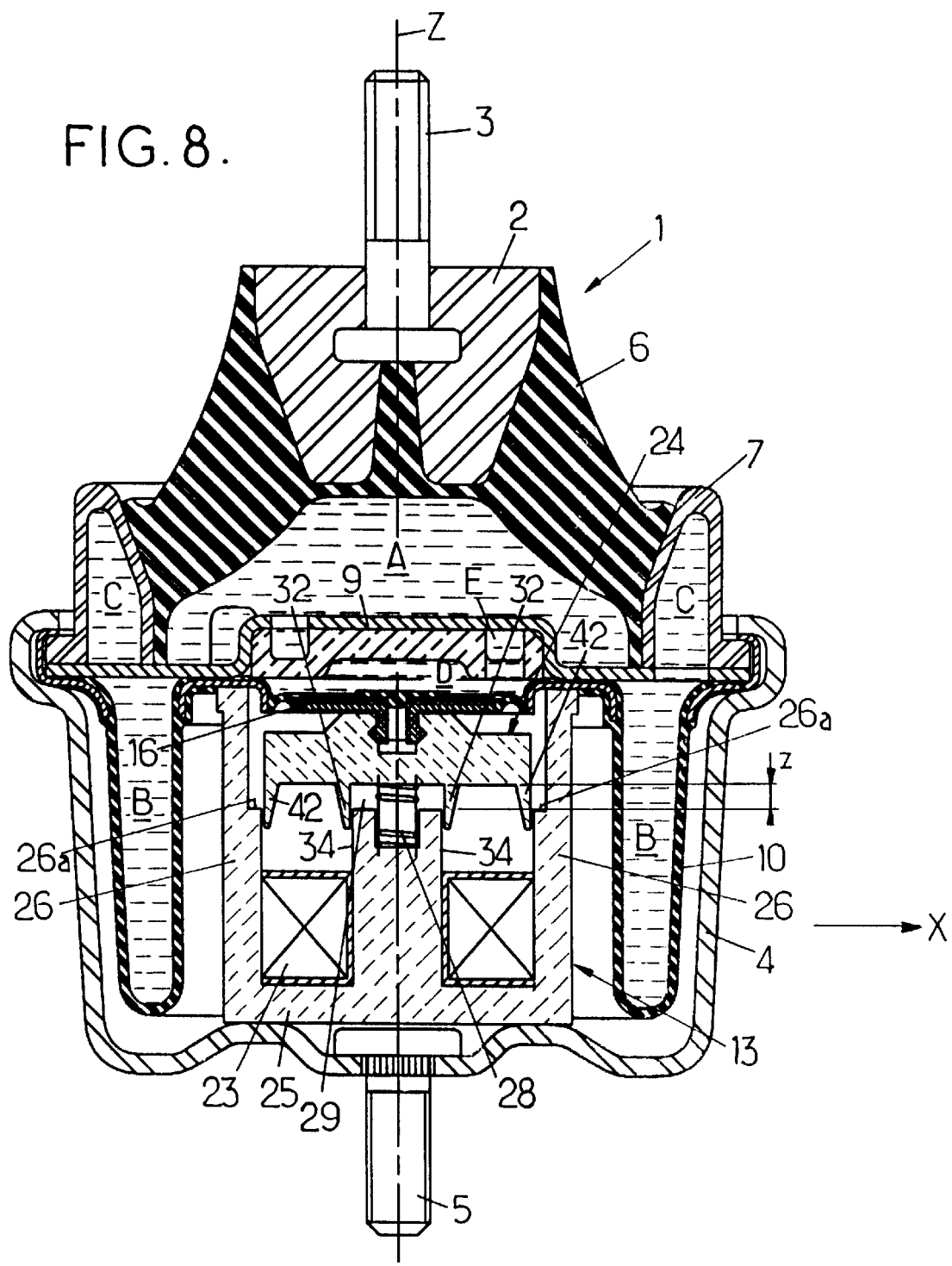
FIGS. 8 and 9 are views similar to that of FIG. 1, showing second and third embodiments proposed by the invention.

As a variant, as illustrated in FIG. 8, the rod 27 could be joined to the frame 13, in which case the mobile core 24 would be reduced to its top part and the linearization poles 32 extending down from this mobile core. In this case, it is also possible to provide two additional linearization poles 42, each of which would be provided as a rib extending horizontally along the axis Y and extending vertically downwards having a transverse width (measured along the axis X which decreases towards the bottom).

These two additional linearization poles 42 are arranged in the vicinity of she side branches 26 of the frame 13, which side branches may have an upwardly directed shoulder 26a on the inside arranged substantially on a level with the additional linearization poles 42. Each of the additional linearization poles 42 has an external vertical face parallel with the internal face of the corresponding side branch 26 of the frame 13.

Figure 9:
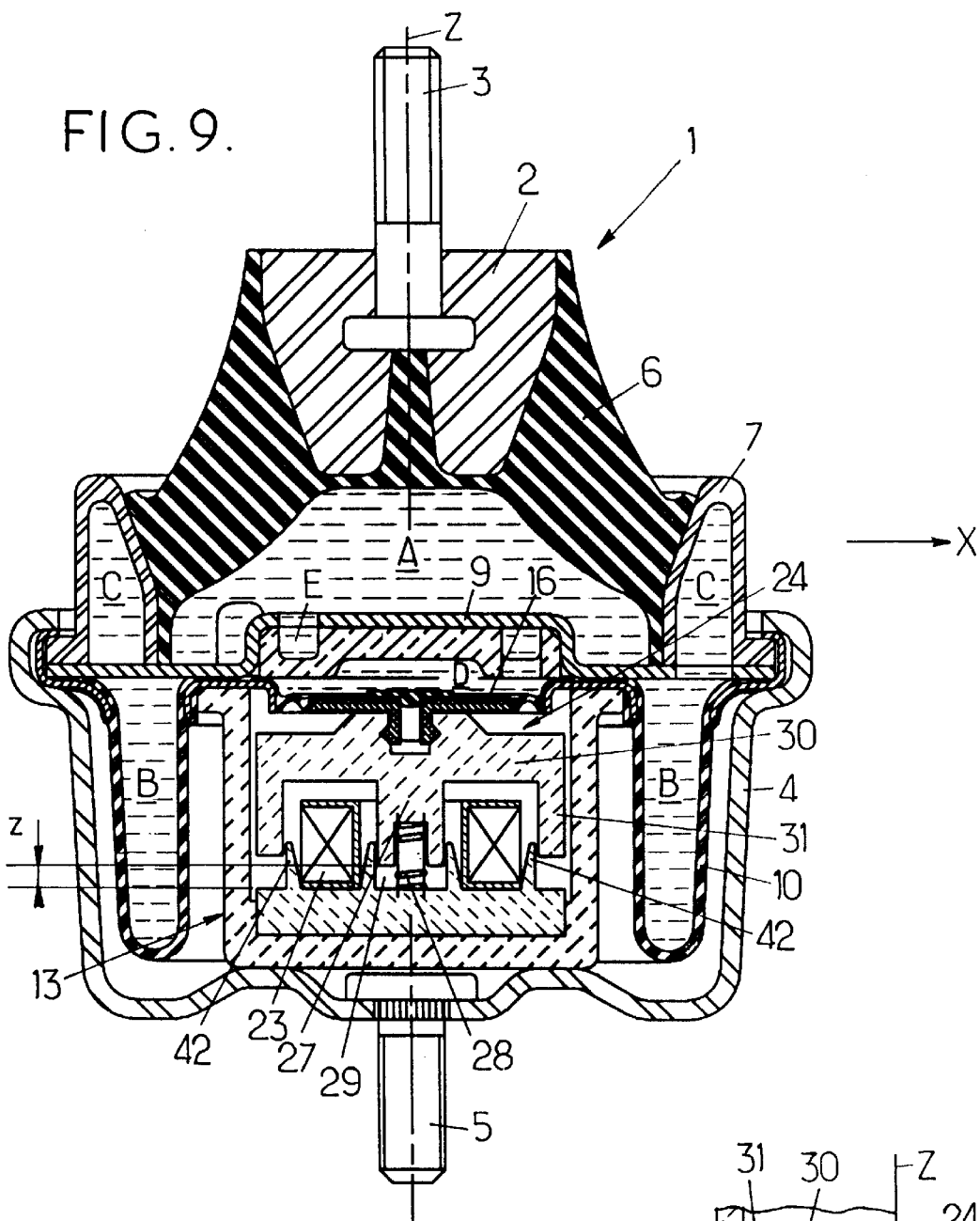

In another embodiment, illustrated in FIG. 9, the linearization poles 32, 42 are joined to the frame 13 as in the example illustrated in FIG. 1, the external vertical faces of the additional linearization poles in this case being arranged facing internal vertical faces of the rims 31 of the mobile core 24.

Figure 10:
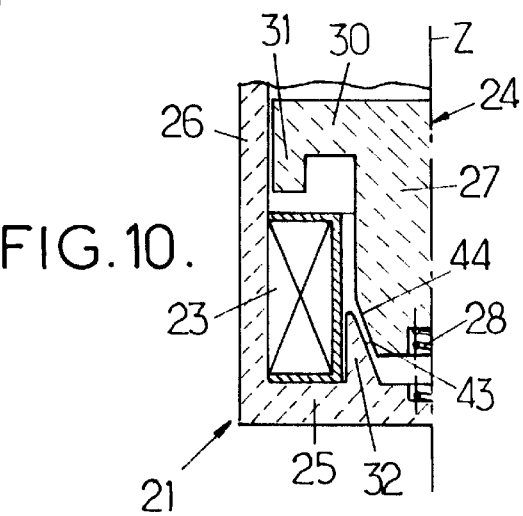
FIG. 10 is a detail showing a fourth embodiment of a part of the electromagnetic actuator as proposed by the invention.

Finally, in yet another embodiment illustrated in FIG. 10, the linearization poles 42 could have external vertical faces and internal faces 43 extending upwards at an angle, in which case the bottom part of the rod 27 of the mobile core has angled faces 44 parallel with said faces 43.

We claim:

1. An active anti-vibration support designed to be inserted between first and second rigid elements in a motor vehicle in order to damp and filter vibrations between these two elements, this support comprising at least:

first and second rigid frames which may be joined respectively to the first and second rigid elements;

an elastomer wall joining the first and second frames to one another defining a working chamber filled with liquid;

a piston having at least one face in contact with the liquid and which is mounted on the first frame so that it can be displaced along an axis of vibration, this piston being biased towards a rest position by resilient means; and an electromagnetic actuator comprising:
an electromagnet comprising an electric coil cooperating with a metal frame; and
a mobile magnetic core which is displaceable and which is linked to the piston in order to generate counter-vibrations in the liquid,
wherein the electromagnetic actuator is a proportional electromagnet actuator, the frame of the electromagnet and the mobile core being of shapes designed so that when an electric current of a value falling within a certain operating range is passed through the coil and the mobile core is located within a certain range of positions, the mobile core is subjected to a force depending solely on this current,
wherein the frame of the electromagnet and the mobile core are of shapes designed so that the mobile core is subjected to a force proportional to the square of the intensity of the electric current passing through the coil if this electric current is of a value falling within said operating range and the mobile core is located within said range of positions.

2. An active anti-vibration support designed to be inserted between first and second rigid elements in a motor vehicle in order to damp and filter vibrations between these two elements, this support comprising at least:
- first and second rigid frames which may be joined respectively to the first and second rigid elements;
- an elastomer wall joining the first and second frames to one another defining a working chamber filled with liquid;
- a piston having at least one face in contact with the liquid and which is mounted on the first frame so that it can be displaced along an axis of vibration, this piston being biased towards a rest position by resilient means;
- a flexible elastomer wall which is supported by the first frame and which defines a compensating chamber filled with liquid communicating with the working chamber via a throttled passage; and
- an electromagnetic actuator comprising:
  - an electromagnet comprising an electric coil cooperating with a metal frame; and
  - a mobile magnetic core which is displaceable and which is linked to the piston in order to generate counter-vibrations in the liquid;
  - wherein the electromagnetic actuator is a proportional electromagnet actuator, the frame of the electromagnet and the mobile core being of shapes designed so that when an electric current of a value falling within a certain operating range is passed through the coil and the mobile core is located within a certain range of positions, the mobile core is subjected to a force depending solely on this current.

3. An active anti-vibration support designed to be inserted between first and second rigid elements in a motor vehicle in order to damp and filter vibrations between these two elements, this support comprising at least:
- first and second rigid frames which may be joined respectively to the first and second rigid elements;
- an elastomer wall joining the first and second frames to one another defining a working chamber filled with liquid;
- a piston having at least one face in contact with the liquid and which is mounted on the first frame so that it can be displaced along an axis of vibration, this piston being biased towards a rest position by resilient means;
- a control chamber filled with liquid which communicates with the working chamber via a throttled passage, the piston being in contact with the liquid contained in this control chamber; and
- an electromagnetic actuator comprising:
  - an electromagnet comprising an electric coil cooperating with a metal frame; and
  - a mobile magnetic core which is displaceable and which is linked to the piston in order to generate counter-vibrations in the liquid,
  - wherein the electromagnetic actuator is a proportional electromagnet actuator, the frame of the electromagnet and the mobile core being of shapes designed so that when an electric current of a value falling within a certain operating range is passed through the coil and the mobile core is located within a certain range of positions, the mobile core is subjected to a force depending solely on this current.

4. An active anti-vibration support designed to be inserted between first and second rigid elements in a motor vehicle in order to damp and filter vibrations between these two elements, this support comprising at least:
- first and second rigid frames which may be joined respectively to the first and second rigid elements;
- an elastomer wall joining the first and second frames to one another defining a working chamber filled with liquid;
- a piston having at least one face in contact with the liquid and which is mounted on the first frame so that it can be displaced along an axis of vibration, this piston being biased towards a rest position by resilient means; and
- an electromagnetic actuator comprising:
  - an electromagnet comprising an electric coil cooperating with a metal frame, and
  - a mobile magnetic core which is displaceable and which is linked to the piston in order to generate counter-vibrations in the liquid,
  - wherein the electromagnetic actuator is a proportional electromagnet actuator, the frame of the electromagnet and the mobile core being of shapes designed so that when an electric current of a value falling within a certain operating range is passed through the coil and the mobile core is located within a certain range of positions, the mobile core is subjected to a force depending solely on this current,
  - wherein the force exerted by the electromagnet on the mobile core is always directed in a same direction and has a certain mean value, the resilient means being arranged so as to bias the mobile core in the direction opposite the force exerted by the electromagnet, these resilient means being dimensioned so that when the electromagnet exerts said mean force on the mobile core, the mobile core is located in a mean position, substantially centered relative to said range of positions.

5. An active anti-vibration support designed to be inserted between first and second rigid elements in a motor vehicle in order to damp and filter vibrations between these two elements, this support comprising at least:
- first and second rigid frames which may he joined respectively to the first and second rigid elements;
- an elastomer wall joining the first and second frames to one another defining a working chamber filled with liquid;
- a piston having at least one face in contact with the liquid and which is mounted on the first frame so that it can be displaced along an axis of vibration, this piston being biased towards a rest position by resilient means; and
- an electromagnetic actuator comprising:
  - an electromagnet comprising an electric coil cooperating with a metal frame; and
  - a mobile magnetic core which is displaceable and which is linked to the piston in order to generate counter-vibrations in the liquid,
  - wherein the electromagnetic actuator is a proportional electromagnet actuator, the frame of the electromagnet and the mobile core being of shapes designed so that when an electric current of a value falling within a certain operating range is passed through the coil and the mobile core is located within a certain range of positions, the mobile core is subjected to a force depending solely on this current,
  - wherein the metal frame and the mobile core of the electromagnet are made from a laminated metal material, one of which constitutes a first magnetic element and the other a second magnetic element, the frame substantially being of a U-shape with a base extending along a transverse axis perpendicular to the vibration axis between two side branches extending parallel with the vibration axis, the coil being arranged between the side branches and centered on the vibration axis surrounding a central rod extending along said vibration axis and belonging to the first magnetic element, this central rod being separated from the second magnetic element by said air gap along the vibration axis and the second magnetic element also having two first linearization poles which frame the central rod along the transverse axis and which extend parallel with the vibration axis inside the coil, having a transverse width which decreases towards the first magnetic element, the first two linearization poles and the central rod respectively having parallel faces which face one another.

6. An anti-vibration support as claimed in claim 5, in which the first magnetic element also has two second linearization poles which are mutually aligned along the transverse axis and which are arranged outside the coil, each of these two second linearization poles extending along the vibration axis having a transverse width which decreases towards the second magnetic element, this second magnetic element having two axial walls which extend along the vibration axis and which frame the two second linearization poles, the two second linearization poles and the two axial walls respectively having parallel faces facing one another.

7. An active anti-vibration system including an active anti-vibration support designed to be inserted between first and second rigid elements in a motor vehicle in order to damp and filter vibrations between these two elements, the system comprising at least:

first and second rigid frames which may be joined respectively to the first and second rigid elements;

an elastomer wall joining the first and second frames to one another defining a working chamber filled with liquid;

a piston having at least one face in contact with the liquid and which is mounted on the first frame so that it can be displaced along an axis of vibration, this piston being biased towards a rest position by resilient means;

a control circuit which supplies the coil of the electromagnet, this control circuit being set up so as to determine at each instant the current applied to the coil as a function of at least one parameter linked to the operation of an engine, independently of the instantaneous position of the mobile core relative to the frame of the electromagnet, wherein a signal representative of the electric current is substantially a rectangular signal and the anti-vibration support has a control chamber filled with liquid which communicates with the working chamber via a throttled passage, the piston being in contact with the liquid contained in this control chamber; and an electromagnetic actuator comprising:
an electromagnet comprising an electric coil cooperating with a metal frame; and
a mobile magnetic core which is displaceable and which is linked to the piston in order to generate counter-vibrations in the liquid, wherein the electromagnetic actuator is a proportional electromagnet actuator, the frame of the electromagnet and the mobile core being of shapes designed so that when an electric current of a value falling within a certain operating range is passed through the coil and the mobile core is located within a certain range of positions, the mobile core is subjected to a force depending solely on this current.

8. An anti-vibration system as claimed in claim 7, in which the control circuit has a computer for controlling the motor vehicle, which is set up to determine at each instant the electric current applied to the coil of the electromagnet as a function of a synchronization signal representative of the engine operation and as a function of data stored in memory, which stored data give at least the amplitude and the phase of a signal representative of the electric current applied to the coil as a function of said synchronization signal.

9. An active anti-vibration system including an anti-vibration support designed to be inserted between first and second rigid elements in a motor vehicle in order to damp and filter vibrations between these two elements, this support comprising at least:

first and second rigid frames which may be joined respectively to the first and second rigid elements;

an elastomer wall joining the first and second frames to one another defining a working chamber filled with liquid;

a piston having at least one face in contact with the liquid and which is mounted on the first frame so that it can be displaced along an axis of vibration, this piston being biased towards a rest position by resilient means;

a control circuit which supplies the coil of the electromagnet, this control circuit being set up so as to determine at each instant the current applied to the coil as a function of at least one parameter linked to the operation of an engine, independently of the instantaneous position of the mobile core relative to the frame of the electromagnet, wherein the engine has a certain speed and the control circuit is set up to apply to the coil of the electromagnet an electric current strong enough to lock the mobile core if the synchronization signal corresponds to an engine speed in excess of a predetermined frequency; and an electromagnetic actuator comprising:
an electromagnet comprising an electric coil cooperating with a metal frame; and
a mobile magnetic core which is displaceable and which is linked to the piston in order to generate counter-vibrations in the liquid, wherein the electromagnetic actuator is a proportional electromagnet actuator, the frame of the electromagnet and the mobile core being of shapes designed so that when an electric current of a value falling within a certain operating range is passed through the coil and the mobile core is located within a certain range of positions, the mobile core is subjected to a force depending solely on this current.

* * * * *